United States Patent
Bellasalma et al.

(10) Patent No.: US 7,293,910 B2
(45) Date of Patent: Nov. 13, 2007

(54) SURGE SUPPRESSOR FOR A MIXER HEAD ASSEMBLY

(75) Inventors: Gerard Jay Bellasalma, Yorba Linda, CA (US); Joon Taek Kim, West Hollywood, CA (US); Lloyd Ramsey, Winters, CA (US)

(73) Assignee: Masco Corporation, Taylor, MI (US)

( * ) Notice: Subject to any disclaimer, the term of this patent is extended or adjusted under 35 U.S.C. 154(b) by 1058 days.

(21) Appl. No.: 09/864,809

(22) Filed: May 24, 2001

(65) Prior Publication Data

US 2002/0176317 A1 Nov. 28, 2002

(51) Int. Cl.
*B01F 15/02* (2006.01)
(52) U.S. Cl. ..................... 366/182.4; 138/45
(58) Field of Classification Search ................ 425/557, 425/563, 382.4; 84/388, 389, 391, 392; 137/7, 137/12, 494, 505, 505.12, 505.13, 505.18, 137/628, 630.16, 630.19, 630.2; 251/12, 251/62, 63, 63.4–63.6; 366/152.1, 152.2, 366/182.4; 138/45
See application file for complete search history.

(56) References Cited

U.S. PATENT DOCUMENTS

| | | | |
|---|---|---|---|
| 210,209 A * | 11/1878 | Pfaudler | |
| 558,839 A * | 4/1896 | Prusmann | |
| 753,773 A * | 3/1904 | Wilkinson | |
| 887,120 A * | 5/1908 | Paulson | |
| 1,196,121 A * | 8/1916 | Larsen | |
| 1,558,064 A * | 10/1925 | Thrift | |
| 1,729,568 A * | 9/1929 | Couturier | |
| 1,731,519 A * | 10/1929 | Bastian | |
| 2,131,836 A * | 10/1938 | Davidson | 138/45 |
| 2,311,336 A * | 2/1943 | Gora | |
| 3,375,845 A * | 4/1968 | Behm | |
| 3,973,464 A * | 8/1976 | Novy | |
| 4,120,923 A * | 10/1978 | Kloker et al. | 264/45.3 |
| 4,294,284 A * | 10/1981 | Herd | |
| 4,349,324 A | 9/1982 | Neff et al. | |
| 4,670,831 A | 6/1987 | Fauvet et al. | |
| 4,774,059 A * | 9/1988 | Wagner | 422/131 |
| 4,798,527 A | 1/1989 | Gunda | |
| 5,173,312 A | 12/1992 | Julinot | |
| 6,247,493 B1 * | 6/2001 | Henderson | |
| 6,390,661 B1 * | 5/2002 | Bellasalma et al. | |

* cited by examiner

*Primary Examiner*—David Sorkin
(74) *Attorney, Agent, or Firm*—Carlson, Gaskey & Olds (57) ABSTRACT

A valve assembly for a molding system includes a plurality of sequentially activated valves. The valves suppress the initial surge of each individual fluid material component such that a proper quantity of each component is supplied to the mix head at the beginning of each cycle. Each of the valves includes a respective opening. The feed assembly continues to force fluid material against a first valve until the pressure is above a predetermine value. Once the pressure is above the predetermined value, the controller releases the pressure from an actuator associated with the first valve such that the valve opens. Fluid material can now flow through the valve assembly at a rate suppressed by the first valve. As the feed assembly continues to build toward it operational pressure, each remaining partially closed valve is opened in sequence. The restriction of one valve is thereby replaced by a lesser restriction. By opening the valves at a predetermined pressures the pressure buildup can be readily controlled.

31 Claims, 7 Drawing Sheets

Fig-2A CLOSED

SURGE SUPPRESSOR FOR A MIXER HEAD ASSEMBLY

BACKGROUND OF THE INVENTION

The present invention relates to a molding system, and more particularly to a valve assembly which suppresses an initial surge of a fluid material component from a feed assembly.

Many molding systems provide for the mixing of at least two fluid materials to form a harden able or settable mixture which can be discharged into a mold cavity in the formation of an article molded of synthetic resin. One particular mixture includes three components, a catalyst, a matrix polymer and a foaming agent.

The fluid materials are typically fed from a multiple of supplies by a delivery or feed assembly which communicates with a mixing head. All the fluid materials are mixed in the mixing head and discharged into the mold cavity to form the molded article.

All the fluid materials must be efficiently mixed at the mix head to assure a homogeneous composition of the finished material. Since each fluid material typically has a different viscosity, difficulties may arise when the multiple materials are feed to the mix head to provide the proper ratio for the finished material. If the materials are not properly metered upon initial injection, the higher viscosity materials will over populate the ratio. As the catalyst is typically of the highest viscosity, premature curing and an unsightly finished material may result.

Accordingly, it is desirable to provide a valve assembly which assures the proper delivery of each fluid material to the mix head in the proper ratio and from initiation of each cycle of the molding machine.

SUMMARY OF THE INVENTION

A valve assembly according to the present invention generally includes a plurality of sequentially activated valves. A feed assembly supplies the fluid material components to the mix head under pressure. The valves suppress the initial surge of each individual fluid material component such that a proper quantity of each component (which typically differ in viscosity) is supplied to the mix head at the beginning of each shot.

Each of the valves includes a respective opening. Each sequential valve includes an opening larger than the previous valve. In a first position, the first valve is fully open and the following valves are partially open. That is, flow through the valves downstream of the first valve in its fully open position provides the limiting flow restriction. Fluid flow through the passage is thus limited by the first valve.

Upon initiation of the system, the feed assembly drives the fluid material component to the valve assembly. As the feed assembly forces material into the closed valve assembly fluid material pressure increase. The pressure is identified by a sensor and relayed to the controller. The feed assembly continues to force fluid material against the first valve until the pressure is above a predetermine value. Once the pressure is above the predetermined value, the controller releases the pressure from an actuator associated with the first valve and the valve opens. Fluid material can now flow through the valve assembly at a rate suppressed by the first valve. As the feed assembly continues to build toward it operational pressure, each remaining partially closed valve is opened in sequence. The restriction of one valve is thereby replaced by a lesser restriction. By opening the valves at predetermined pressures, the pressure buildup can be readily controlled.

Accordingly, the present invention provides a valve assembly which assures the proper delivery of each fluid material to the mix head in the proper ratio and from initiation of each cycle of the molding machine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
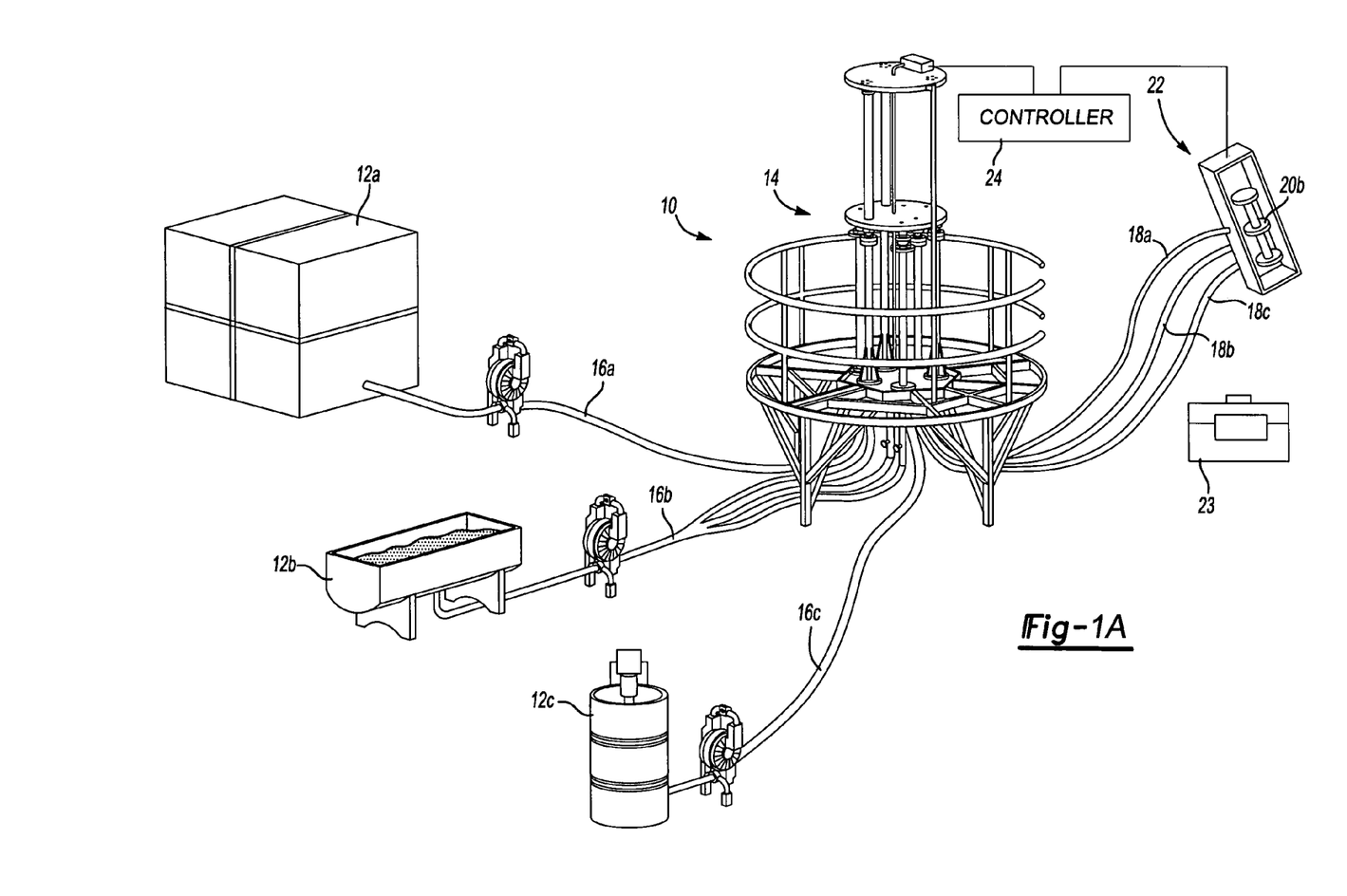
FIG. 1A is a simplified schematic representation of a multiple material molding system.

FIG. 1A schematically illustrates a multiple material molding system 10. The system 10 generally includes a plurality of fluid material supplies 12A, 12B and 12C, which communicate with a feed assembly 14 through respective supply conduits 16A, 16B, 16C. The feed assembly 14 drives a desired quantity of fluid material from each fluid material supply 12A-12C through output conduits 18A-18C and to a respective valve assembly 20A-20C. The valve assemblies 20A-20C (FIG. 1B) meter the initial shot of fluid material from the feed assembly 14 to the mix head assembly 22. As will be further described below, the valve assemblies 20A-20C assure that the initial surge of fluid materials are suppressed so that a proper ratio of each fluid material component is fed to the mix head assembly 22 from the beginning of each shot.

Figure 1B:
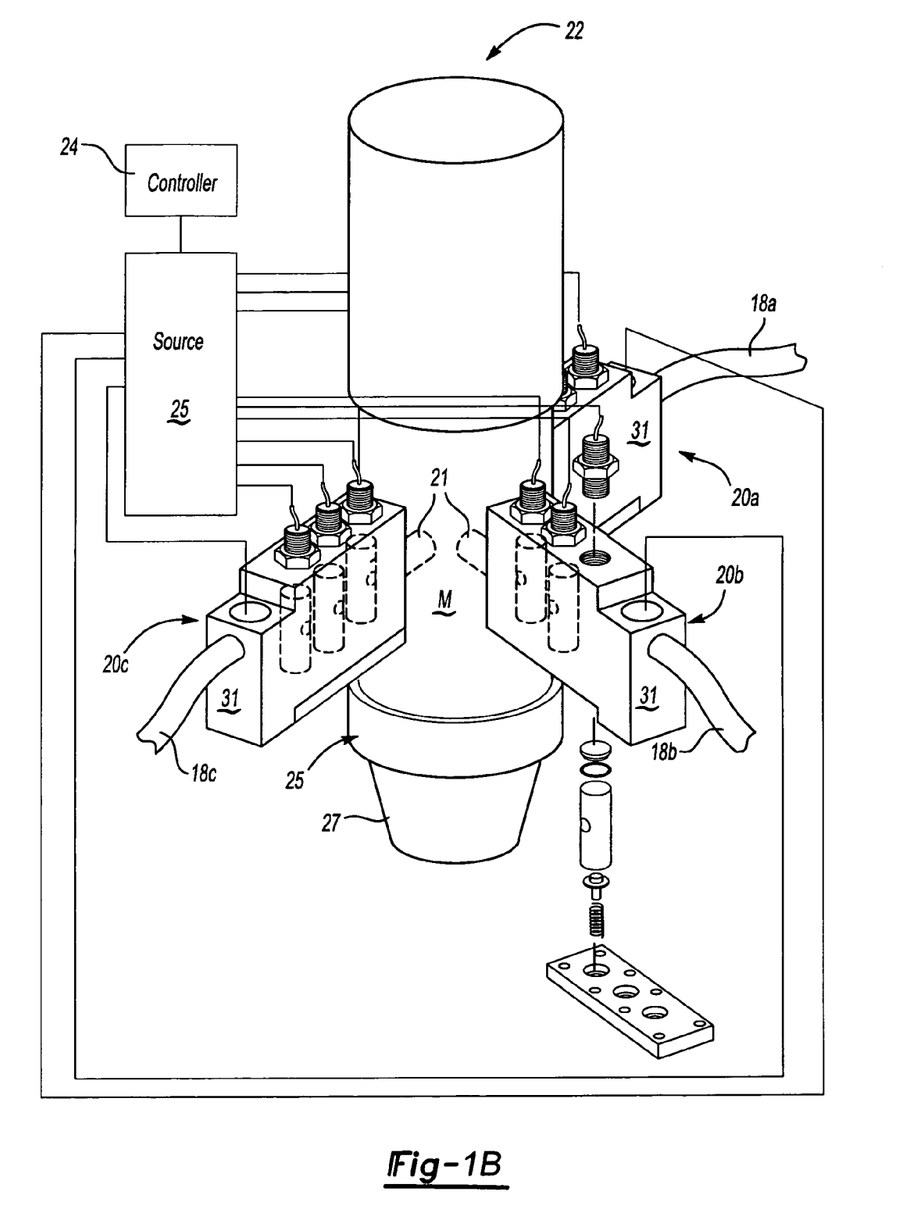
FIG. 1B is an exploded perspective view of a mix head and valve assembly according to the present invention.

The mix head assembly 22 thoroughly mixes the fluid material from the feed assembly 14 in a mix section (illustrated schematically at M; FIG. 1B) and injects the final mixture through an outlet (illustrated schematically at O) into a mold assembly 23 or the like through an outlet 27 from the mixer section M (FIG. 1B). Preferably, a controller 24 communicates with the feed assembly 14, valve assemblies 20, and the mix head assembly 20 to assure the system 10 is operating within predefined parameters. Controls for injection-molding equipment are known in the art and further description of the algorithms will not be further detailed herein. System 10 is preferably utilized for injection molding of very large parts, and in particular bathtubs and shower surrounds.

Figure 2A:
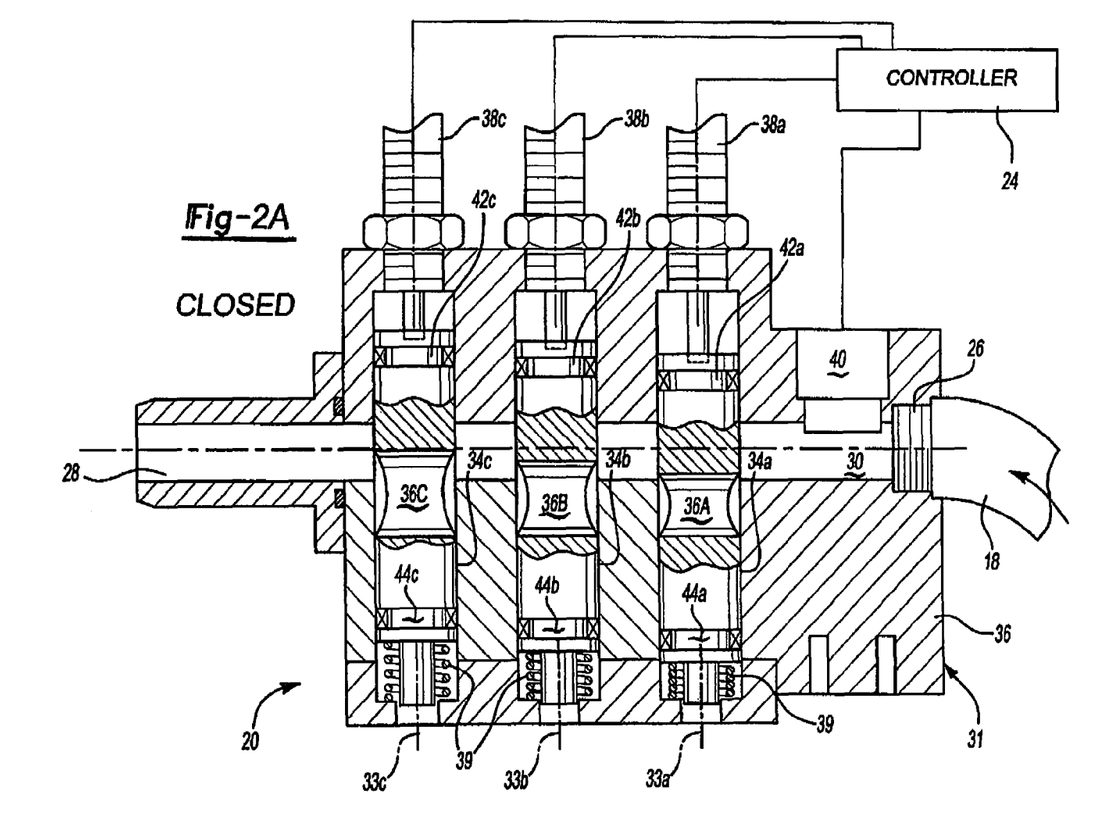
FIG. 2A is a sectional view of a valve assembly according to the present invention in a closed position.

Referring to FIG. 2A, a cross sectional view of one valve assembly 20 according to the present invention is illustrated. The valve assembly 20 generally includes an input port 26, an output port 28 and a passage 30 there between all located within a single housing 31. The input port 26 communicates with one of the output conduits 18 from the feed assembly 14 (FIG. 1A). It should be understood that although only a single valve assembly will be described in the disclosed embodiment, a separate valve assembly is preferably separately provided for each fluid material 12A-12C (FIG. 1A).

The fluid material flows from the input port 26 through the passage 30 where the initial surge of fluid material from the feed assembly is suppressed by a plurality of sequentially activated valves 32A-32C, as will be further described below. The fluid material passes from the passage 30 through the output port 28 and into the mix head assembly 22 (FIGS. 1A and 1B). It should be understood that the feed assembly 14 supplies the fluid material components to the mix head 22 under pressure. The viscosity of the fluid material components therefore affects the initial surge of fluid material components into the mix head. The valves 20 suppress the initial surge of each individual fluid material component such that a proper quantity of each component (which typically differ in viscosity) is supplied to the mix head at the beginning of each shot. Although three valves in each valve assembly are disclosed in the illustrated embodiment, any number of valves will benefit from the present invention.

Each sequentially activated valve 32A-32C, define a respective longitudinal axes 33A-33C which are substantially perpendicular to the passage 30. The valves 32A-32C are selectively movable in chambers 34A-34C which are formed within a valve housing 36. An actuator 38A-38C, such as a pneumatic actuator, individually operates each valve 32A-32C. The actuators 38A-38C are selectively operated by a gas such as air from a source 25 (FIG. 1B) such as a compressor. Preferably, the controller 24 communicates with the source 25 to selectively supply or vent the gas from each actuator 38A-38C in response to the controller 24.

Each sequentially activated valve 32A-32C is biased toward an open position by a respective spring 39. Upon activation of the actuators 38A-38C, the valves 32A-32C overcome the bias of their spring 39 and are thereby maintained in a closed position.

A pressure sensor 40 (illustrated schematically) communicates with the passage 30 such the fluid material pressure within the passage 30 is available to the controller 24. The controller 24 preferably operates the valves 32A-32C in response to the pressure sensor 40. However, other control logic such as time and/or temperature based actuation will also benefit from the present invention. Control logic associated with opening valves in response to a predetermined value such as pressure is well known to one of reasonable skill in the art.

Each of the valves 32A-32C includes a first or top seal 42 and a second or bottom seal 44. It should be realized that the terms "top" and "bottom" refer to the location of the seal relative to the spring 39 and should not be construed to relate to the overall positioning of the valve assembly 20. The seals 42,44 assure that each valve 32A-32C are properly sealed in the chambers 34A-34C while preventing rotation of the valves 32A-32C therein such that their openings 36A-36C are alienable with the passage 30. The seals 42,44 also operate as stops to restrain longitudinal movement of the valves 32A-32C relative to the passage 30. Preferably, the seals 42,44 are threadable into the valve 32 so that the positioning of the opening can be finely adjusted.

Figure 2B:
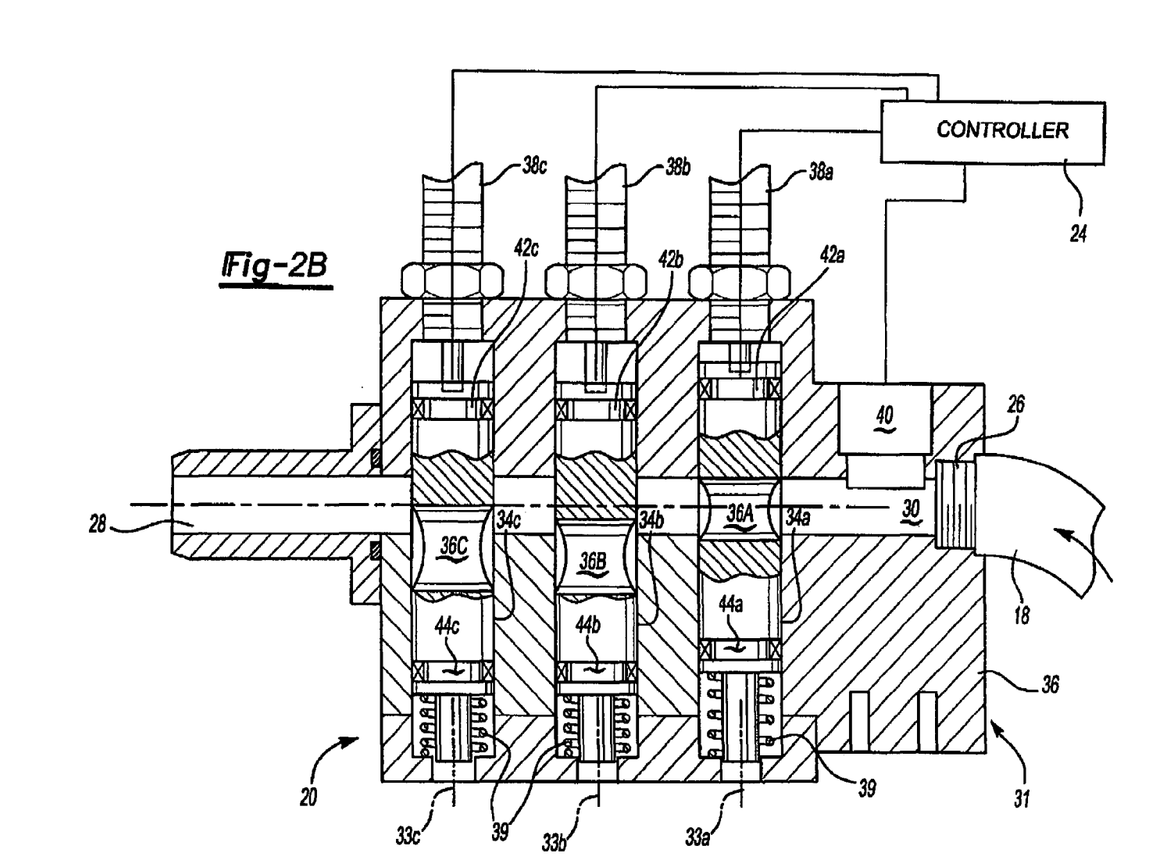
FIG. 2B is a sectional view of a valve assembly according to the present invention in an intermediate position.
Figure 2C:
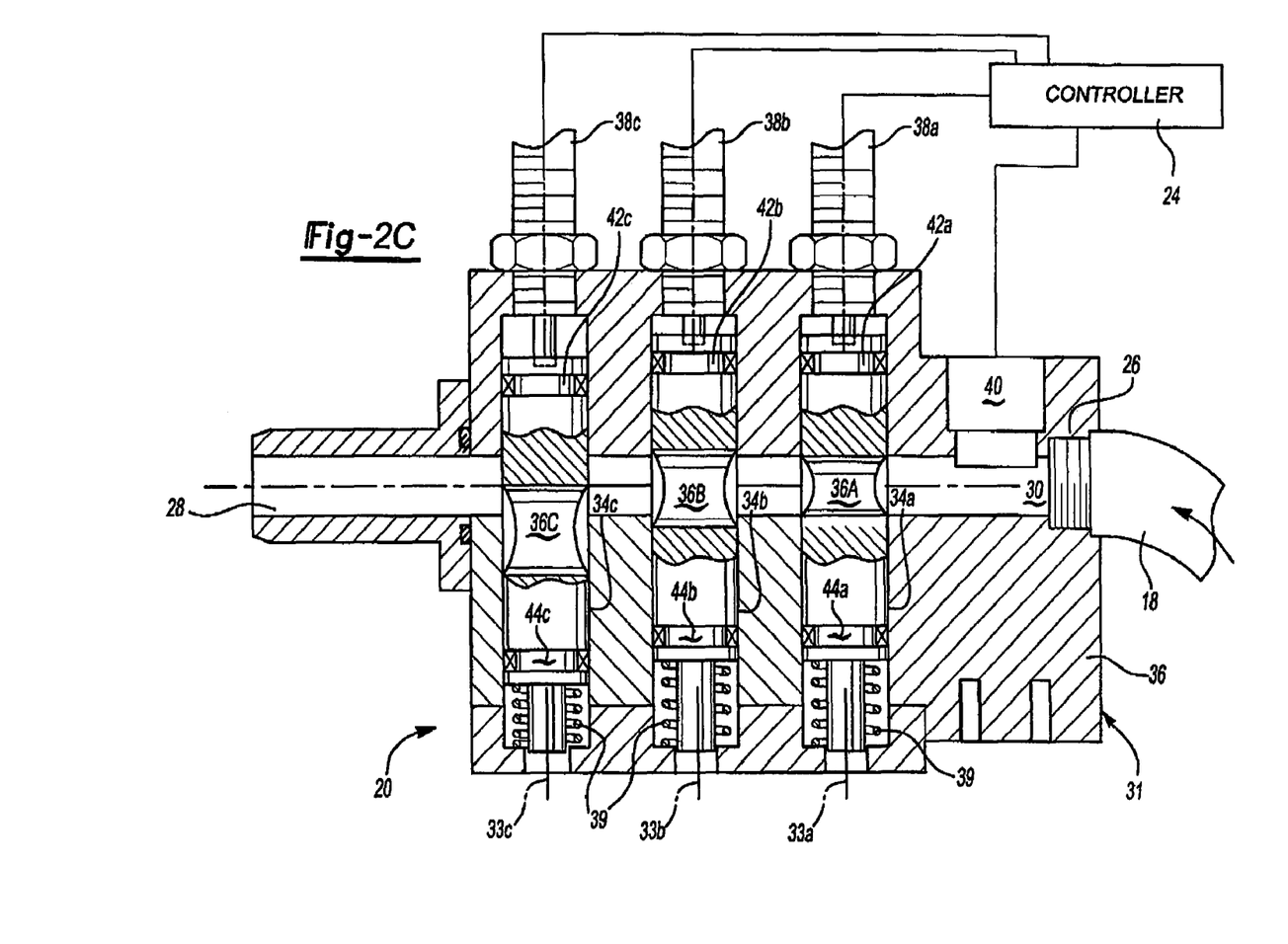
FIG. 2C is a sectional view of a valve assembly according to the present invention in a intermediate position.
Figure 2D:
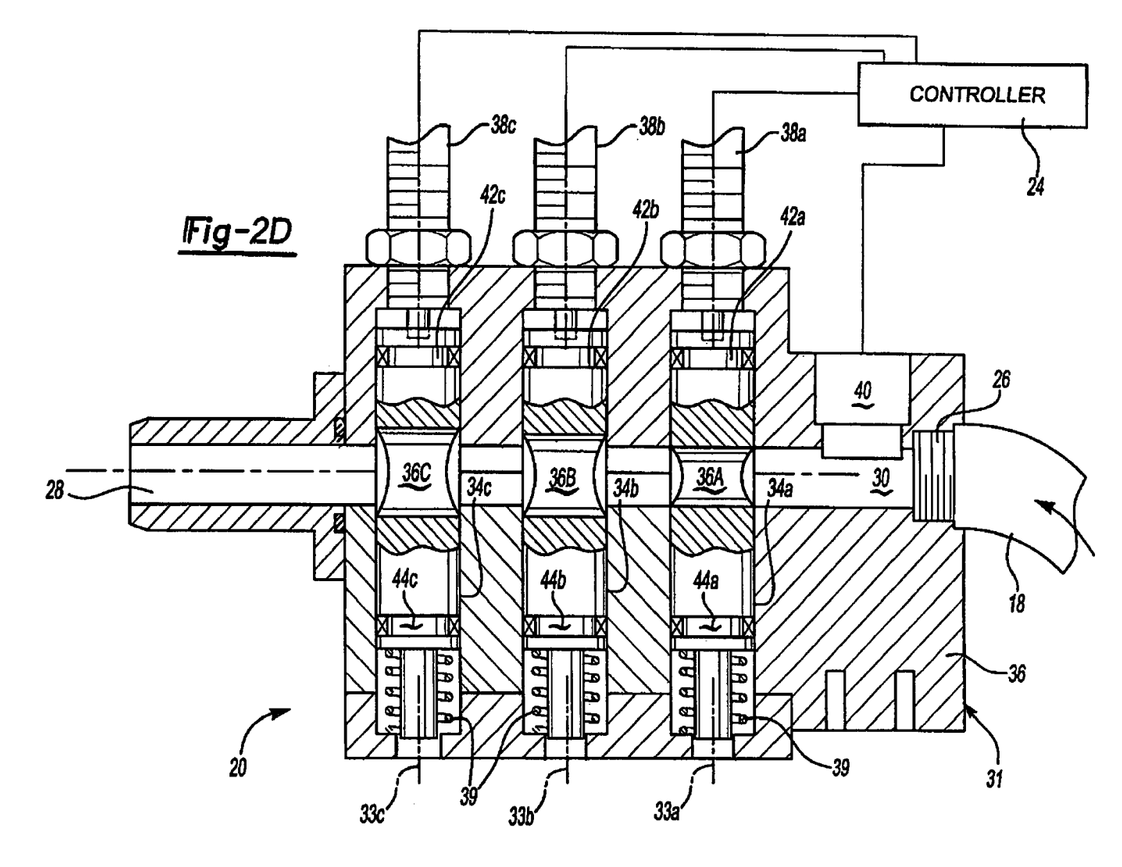
FIG. 2D is a sectional view of a valve assembly according to the present invention in an open position.

The bottom seal 44 includes a reduced diameter stem portion 46 that receives and guides the spring 39 such that each valve 32A-32C is biased toward its open position (FIG. 2D). Additionally, the stems 46 operate as stops for the valves 32A-32C such that the valves are longitudinally located in their correct closed position relative to the passage 30 upon activation of the actuators 38A-38C (FIG. 2A). The top seal 42 similarly operates as an open position stop such that each valve 32A-32C is correctly located along its longitudinal axis 33A-33C when driven to its open position by spring 39 (FIG. 2D).

Each of the valves 32A-32C includes a respective opening 36A-36C. The opening 36A-36C are movable relative to the passage 30 to restrict fluid material flow. Although axial movement is provided in the disclosed embodiment other valve motion, e.g., rotational will also benefit from the present invention. Preferably, opening 36A is sized to be of the same diameter as passage 30. Opening 36B is sized to be larger than opening 36A and opening 36B is sized to be larger than opening 36C. It should be understood that although substantially straight cylindrical openings and passages are illustrated, other configurations will also benefit from the present invention.

Referring to FIG. 2A, the valve assembly 20 is illustrated in a closed position. The bottom seal 44 of each valve 32A-32C is in contact with the housing 35 and the springs 39 are compressed. The bottom seals 44 thereby maintain the valves 32A-32C in their proper position relative to the passage 30. Preferably, in the fully closed position the opening 36A of valve 32A is completely out of alignment with passage 30 such that no fluid material can pass while valves 36B and 36C are partially closed. Preferably valve 36B is open $\frac{1}{16}$ of an inch and valve 36C is open $\frac{1}{8}$ of an inch in a $\frac{1}{2}$ inch passage 30.

The bottom seal 44 of valves 32B and 32C, maintain opening 36B, 36C at least partially in line with passage 30. In other words, a portion of opening 36B and 36C are aligned with passage 30 such that fluid can fluid can flow there through. Preferably, opening 36B and 36C are positioned such that the amount of flow through openings 36B and 36C is at least equivalent to flow through opening 36A when opening 36A is fully open. That is, flow through opening 36A when valve 32A is in its fully open position (FIG. 2B) provides the limiting flow restriction as openings 36B and 36C provides equivalent flow to that through the fully open valve 32A. Fluid flow through passage 30 is thus limited by valve 32A.

Figure 3:
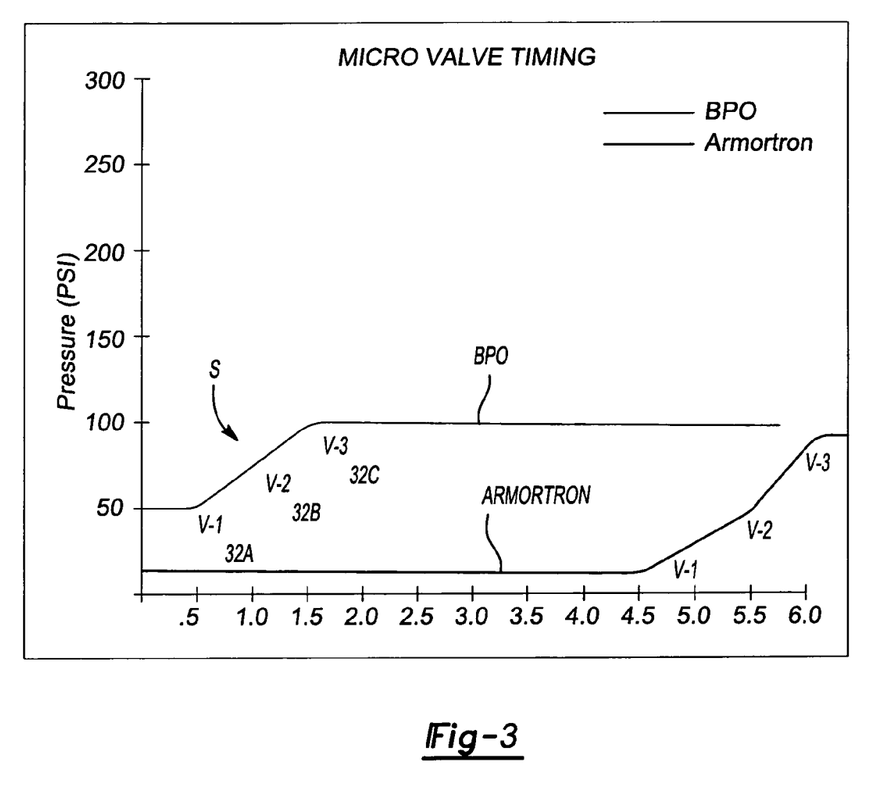
FIG. 3 is a graph illustrating the pressure increase and sequential opening of each valve of the valve assembly according to the present invention in a closed position.

Referring to FIG. 3, operation of the valve assembly 20 is illustrated for two separate fluid material components, for example only, BPO and Armotron. Typically, the viscosity of the fluid material component and its ratio in the final mixture relates to when the valves 32A-32C are opened for each material. Preferably, the valve assemblies 20 operate to release a proper quantity of each fluid material component to obtain the desired ratio from the very beginning of each cycle. That is, the sequential opening is timed to account for the difference in viscosities and percentage of fluid material in the final ration as the feed assembly 14 pressure increases during the introduction of material into the mix head 22 (FIGS. 1A and 1B).

Upon initiation of the system 10, the feed assembly 14 drives the fluid material component (BPO in this example) to the valve assembly 20. As the feed assembly 14 forces material into the closed valve assembly 20 (FIG. 2A) the fluid material pressure increase. The pressure is identified by the sensor 40 and relayed to the controller 24. The feed assembly 14 continues to force fluid material against closed valve 32A until the pressure is above a predetermine value. The predetermined value is determined in part by the viscosity of the fluid material component, its percentage relative to the other components, and the desired feed rate of the feed system. Here, the predetermined value V-1 for BPO is 50 psi. Once the pressure is above 50 psi the controller 24 releases the pressure from the actuator 38A such that valve 32A opens under the force of the spring 39 (FIG. 2B). Valve 32A is opened by the spring 39 until top seal 42 contacts the chamber 34A and opening 36A is aligned with the passage 30. Fluid material may now flow through the valve assembly 20 at a rate suppressed by valve 32A.

As the feed assembly 14 continues to build toward it operational pressure, fluid material is forced into the valve assembly 20. The fluid material flows through the fully open valve 32A and through the partially open valves 32B and 32C. The initial pressure buildup or "surge" toward its operational pressure (100 psi) is thus partially relieved. The feed assembly 14 continues to force material into the valve assembly 20 and the pressure continues to build as valve 32A, although open is still a restriction to the fluid flow.

Once the pressure reaches a second value V-2 (75 psi) the controller 24 releases the pressure from actuator 38B and valve 32B opens under the force of its spring 39 (FIG. 2C). Valve 32B is opened by the spring 39 until top seal 42 contacts the chamber 34B such that the opening 36B is aligned with the passage 30. The restriction of valve 32A is now replaced by the lesser restriction of valve 32B. As the feed assembly 14 continues to force material into the valve assembly 20, the fluid material flows through the fully open valves 32A and 32B and through the partially open valve 32C. Again, valve 32C is partially open to the extent that valve 32B is the limiting restriction in passage 30. In other words, valve 32C is partially opened to be approximately equivalent to the flow restriction provided by valve 32B in the fully open condition (FIG. 2C). The continued pressure buildup is thus further relieved. Finally, as the feed assembly 14 reaches a third value V-3 (100 psi) valve 32C is opened (F*igure* 2*d*) and the fluid material flow into the mix head 22 is stabilized at a steady state. Notably, by opening each valve 32A-32C at a predetermined pressure, the slope S of the pressure buildup can be readily controlled.

As further illustrated by the Armotron fluid material line of FIG. 3, the pressure increase requires a longer period of time. The pressure increase and sequential opening of each valve is then as described with reference to the BPO.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A molding system comprising:
   a mix head comprising;
   an input port to a passage;
   a plurality of adjacent sequentially activatable valves in communication with said passage to selectively suppress a flow of fluid through said passage, said plurality of adjacent sequentially activatable valves each axially movable along a longitudinal axis transverse to said passage; and
   an output port from said passage in communication with said mix head.

2. The system as recited in claim 1, further including a controller to sequentially activate said plurality of sequentially activatable valves to meter an initial flow of the fluid.

3. The system as recited in claim 2, wherein said controller activates each of said plurality of adjacent sequentially activatable valves in response to a predetermined pressure.

4. The system as recited in claim 1, wherein each of said plurality of adjacent sequentially activatable valves include a spring bias toward an open position.

5. The system as recited in claim 1, further including a pneumatic actuator to selectively activate each of said plurality of adjacent sequentially activatable valves in a sequential manner.

6. The system as recited in claim 1, wherein each of said plurality of adjacent sequentially activatable valves defined along said longitudinal axis, each of said plurality of adjacent sequentially activatable valves providing an opening transverse to the longitudinal axis and alienable with said passage.

7. The system as recited in claim 1, wherein said plurality of adjacent sequentially activatable valves includes a first valve, a second valve and a third valve, each of said valves defined along said longitudinal axis substantially transverse to said passage.

8. The system as recited in claim 7, wherein said first valve is adjacent said input port.

9. The system as recited in claim 7, wherein said first valve includes a first opening, said second valve includes a second opening, and said third valve includes a third opening.

10. The system as recited in claim 9, wherein said second opening sized to be larger than said first opening and said third opening sized to be larger than said second opening.

11. The system as recited in claim 9, wherein said plurality of sequentially activatable valves provide an open position wherein said first opening is aligned with said passage and said second opening and said third opening are partially aligned with said passage.

12. The system as recited in claim 9, wherein said plurality of sequentially activatable valves provide an open position wherein said first opening is aligned with said passage, said second opening is aligned with said passage and said third opening is partially aligned with said passage.

13. The system as recited in claim 9, wherein said plurality of sequentially activatable valves provide an open position wherein said first opening, second opening and said third opening are aligned with said passage.

14. The system as recited in claim 1, wherein said plurality of adjacent sequentially activatable valves are located within a valve housing mounted adjacent said mix head.

15. The system as recited in claim 14, further comprising a plurality of said valve housings mounted about a circumference of said mix head, each of said plurality of said valve housings communicating a fluid material into said mix head assembly.

16. The system as recited in claim 1, wherein said plurality of adjacent sequentially activatable valves intersect said passage in a substantially perpendicular orientation.

17. The system as recited in claim 1, wherein said plurality of adjacent sequentially activatable valves are movable along said longitudinal axis in response to a spring bias.

18. The system as recited in claim 17, further including a pneumatic actuator to overcome said spring bias to selectively maintain each of said plurality of adjacent sequentially activatable valves in a closed position.

19. A molding system comprising:
a mix head;
an input port to a passage, said input port communicating with a feed assembly;
a plurality of adjacent sequentially activatable valves each defining a longitudinal axis, each of said plurality of adjacent sequentially activatable valves include an opening transverse to the longitudinal axis and alienable with said passage to selectively suppress a flow of fluid through said passage;
a bias adjacent each of said plurality of sequentially activatable valves to bias said valve toward an open position;
an actuator to selectively activate each of said plurality of adjacent sequentially activatable valves; and
an output port from said passage, said output port in communication with said mix head assembly.

20. The system as recited in claim 19, further including a controller to sequentially activate said plurality of adjacent sequentially activatable valves to meter an initial flow of the fluid.

21. The system as recited in claim 20, wherein said controller activates each of said plurality of adjacent sequentially activatable valves in response to a predetermined pressure.

22. The system as recited in claim 20, wherein said plurality of adjacent sequentially activatable valves includes a first valve, a second valve and a third valve, said first valve adjacent said output port.

23. The system as recited in claim 22, wherein said first valve includes a first opening, said second valve includes a second opening, and said third valve includes a third opening.

24. The system as recited in claim 23, wherein said second opening sized to be larger than said first opening and said third aperture sized to be larger than said second opening.

25. The system as recited in claim 19, wherein said plurality of adjacent sequentially activatable valves are located within a valve housing mounted adjacent said mix head assembly.

26. The system as recited in claim 25, further comprising a plurality of said valve housings mounted about a circumference of said mix head assembly, each of said valve assemblies communicating a fluid material to said mix section.

27. The system as recited in claim 19, wherein said plurality of adjacent sequentially activatable valves intersect said passage in a substantially perpendicular orientation.

28. A molding system comprising:
a mix head assembly having an outlet;
an input port to a passage defined within a valve housing, said passage generally transverse to said outlet;
a plurality of adjacent sequentially activatable valves within said valve housing, each of said plurality of adjacent sequentially activatable valves defining a longitudinal axis transverse to said passage and an opening alienable with said passage;
a bias adjacent each of said plurality of adjacent sequentially activatable valves to bias said valve toward an open position in which each of said openings are in alignment with said passage;
an actuator to selectively activate each of said plurality of sequentially activatable valves;
an output port from said passage, said output port in communication with said mix head assembly; and
a controller in communication with said actuator to sequentially activate said plurality of adjacent sequentially activatable valves to meter an initial flow of a fluid material to selectively suppress a flow of fluid material through said passage and into said mix head assembly.

29. The system as recited in claim 28, wherein said plurality of sequentially activatable valves includes a first valve, a second valve and a third valve, said first valve includes a first opening, said second valve includes a second opening, and said third valve includes a third opening, said second opening sized to be larger than said first opening and said third opening sized to be larger than said second opening.

30. The system as recited in claim 28, wherein said valve housing is mounted to said mix head assembly.

31. The system as recited in claim 28, further comprising a plurality of said valve housings mounted about a circumference of said mix head, each of said valve housing communicating a distinct fluid material to said mix head assembly.

* * * * *

UNITED STATES PATENT AND TRADEMARK OFFICE
CERTIFICATE OF CORRECTION

PATENT NO.         : 7,293,910 B2  
APPLICATION NO.    : 09/864809  
DATED              : November 13, 2007  
INVENTOR(S)        : Bellasalma et al.

Page 1 of 1

It is certified that error appears in the above-identified patent and that said Letters Patent is hereby corrected as shown below:

Claim 6, Column 6, line 19: "alienable" should read as --alignable--

Claim 19, Column 7, lines 10-11: "alienable" should read as --alignable--

Claim 28, Column 8, line 13: "alienable" should read as --alignable--

Signed and Sealed this

Twenty-ninth Day of April, 2008

JON W. DUDAS  
*Director of the United States Patent and Trademark Office*